US012599924B2

(12) United States Patent
Chang

(10) Patent No.: US 12,599,924 B2
(45) Date of Patent: Apr. 14, 2026

(54) ATOMIZATION BOTTLE AND LIQUID ATOMIZATION DEVICE INCLUDING THE ATOMIZATION BOTTLE

(71) Applicant: NOVACORP INC., Guangzhou City (CN)

(72) Inventor: Ming-Cheng Chang, Tainan (TW)

(73) Assignee: NOVACORP INC., Guangzhou City (CN)

( * ) Notice: Subject to any disclaimer, the term of this patent is extended or adjusted under 35 U.S.C. 154(b) by 735 days.

(21) Appl. No.: 18/085,713

(22) Filed: Dec. 21, 2022

(65) Prior Publication Data

US 2023/0264221 A1 Aug. 24, 2023

(30) Foreign Application Priority Data

Feb. 21, 2022 (TW) ................................. 111106155

(51) Int. Cl.
*B05B 17/06* (2006.01)

(52) U.S. Cl.
CPC ...... *B05B 17/0615* (2013.01); *B05B 17/0676* (2013.01)

(58) Field of Classification Search
CPC . B05B 17/06; B05B 17/0646; B05B 17/0607; B05B 17/0638; B05B 17/0615; B05B 17/0676; B05B 1/14; B05B 1/24; B05B 1/08; B05B 11/0054; B05B 12/04
See application file for complete search history.

(56) References Cited

U.S. PATENT DOCUMENTS

2003/0218077 A1* 11/2003 Boticki ............... B05B 17/0676 239/102.1
2010/0222752 A1* 9/2010 Collins, Jr. ......... B05B 17/0623 604/296

* cited by examiner

*Primary Examiner* — Christopher R Dandridge
(74) *Attorney, Agent, or Firm* — Che-Yang Chen; Law Office of Michael Chen

(57) ABSTRACT

An atomization device includes an atomization machine and an atomization bottle which can be disposed after use. The atomization bottle receives a liquid to be atomized to form a mist. The atomization bottle includes an atomization bottle cork to prevent leakage of the liquid. The atomization bottle cork includes an atomizer fee of power and any control module. A power supply and a control module are disposed on a machine body of the atomization machine. When the atomization bottle is coupled with the atomization machine, the atomizer can be activated by the control module to generate a mist. After the liquid in the atomization bottle is used up, the atomization bottle can be replaced by a new atomization bottle.

19 Claims, 13 Drawing Sheets

ATOMIZATION BOTTLE AND LIQUID ATOMIZATION DEVICE INCLUDING THE ATOMIZATION BOTTLE

BACKGROUND OF THE INVENTION

The present invention relates to a liquid atomization device and, more particularly, to a disposable atomization bottle cooperating with an atomization machine to atomize a liquid in the atomization bottle into a mist.

An atomization device currently available on the market can be used to moisturize a space and generally includes an atomization vibrating film (or so-called "ultrasonic wave vibration film") for separating a liquid, such as water, into particles to form a mist, and the atomization vibrating film and the atomization device are integrally constructed. The atomization device further includes a barrel receiving the liquid.

Some users may add an essence, a purification liquid, or liquid medicine for inhalation into pure water in the atomization device for various uses. However, after a period of time of adding other substances into the pure water, filth is apt to accumulate on the surface of the surface of the atomization vibrating film, adversely affecting normal use of the atomization vibrating film. Improvement to this problem is desired.

BRIEF SUMMARY OF THE INVENTION

To solve the above problem, in a first aspect, the present invention provides an atomization bottle comprising:

a bottle including a bottleneck, wherein the bottle is configured to receive a liquid to be atomized, and an atomization bottle cork sealingly coupled with the bottleneck of the bottle, wherein the atomization bottle cork includes an atomizer free of power and a power module, wherein the atomization bottle cork further includes an electrically conductive module in electrical connection with the atomizer, wherein the electrically conductive module includes two electrically conductive portions configured to be in electrical connection with an atomization machine, wherein the atomization bottle cork is configured to prevent passage of the liquid but allow atomized tiny water molecules to pass through the atomizer and to be sprayed to an outside of the bottle.

Conventionally, the whole atomization device must be replaced or repaired when filth accumulates on the surface of the atomization vibration film. The disposable design of the atomization bottle (with an atomization vibration film) in each embodiment solves this problem at a small cost. Furthermore, the manufacturers can be continually benefited such as by selling atomization bottles containing various liquids having different flavors, different effects or different functions.

In an example, the atomization bottle cork further includes:

a cap sealingly and detachably coupled with the bottleneck, wherein when the cap is not detached, the atomization bottle cork is sealed, and electrical connection with the two electrically conductive portions is prevented, wherein when the cap is detached, the atomization bottle cork is exposed to permit electrical connection with the two electrically conductive portions; and a main cork body, wherein the bottle further includes a chamber receiving the liquid, wherein the chamber includes an opening section located in the bottleneck and intercommunicating with the outside of the bottle, wherein the main cork body includes an outer periphery sealingly coupled with the opening section and an outer surface facing the outside of the bottle, wherein the main cork body further includes a recessed portion extending from the outer surface and a main cork body through-hole intercommunicating with the recessed portion and the opening section, wherein the atomizer is received in the recessed portion and seals the main cork body through-hole, wherein the outer surface of the main cork body is spaced from a distal end of the bottleneck in an axial direction of the opening section and is received in the opening section.

The cork seals the opening section, such that leakage of the liquid in the chamber is prevented before using the atomization bottle while preventing ambient impurities or dust from contacting with the atomization bottle cork.

In an example, the electrically conductive module is received in the recessed portion. The atomizer is located between the electrically conductive module and the main cork body through-hole. The electrically conductive module includes a module through-hole aligned with the main cork body through-hole. The atomizer includes an atomization vibration film aligned with the module through-hole and the main cork body through-hole.

The outer surface of the main cork body is spaced from the distal end of the bottleneck, such that a consumer is difficult to detach the atomization bottle cork by himself or herself, avoiding the consumer from adding improper ingredients into the liquid, thereby avoiding malfunction of or affection on the surface of the atomization vibration film.

In an example, the electrically conductive module further includes a first side and a second side spaced from the first side. The second side faces the atomizer. The module through-hole extends from the first side through the second side. Two electrically conductive portions are formed on the first side. The electrically conductive module further includes two contacts extending from the two electrically conductive portions to the second side. The atomizer is in electrical connection with the two contacts.

In an example, the atomization bottle cork further includes:

a supporting tube including an engaging end and a closed end, wherein the supporting tube further includes a receiving chamber extending from the engaging end towards but spaced from the closed end, wherein the main cork body further includes an inner face spaced from the outer surface in an axial direction of the main cork body through-hole, wherein the main cork body further includes a coupling skirt extending from the inner surface and defining a hole intercommunicating with the main cork body through-hole, wherein the engaging end of the supporting tube is coupled with the coupling skirt of the main cork body, wherein the closed end of the supporting tube extends into the chamber of the bottle, and wherein the liquid enters the receiving chamber; and a delivery member received in the receiving chamber of the supporting tube, wherein the delivery member includes an outer end abutting the atomizer, and wherein the delivery member is configured to deliver the liquid to the atomizer.

In an example, the atomization bottle further comprises a supporting spring. The delivery member includes an inner end spaced from the outer end. The supporting spring is disposed between the closed end of the supporting tube and the inner end of the delivery member and is configured to support the outer end of the delivery member to abut against the atomizer. The delivery member delivers the liquid in the chamber towards atomizer under capillary action.

In an example, the atomization bottle cork further includes a sealing gasket received in the recessed portion. The sealing gasket includes first and second surfaces spaced from each other in the axial direction of the main cork body through-hole. The sealing gasket further includes a gasket through-hole extending from the first surface through the second surface. The gasket through-hole has an inner periphery. The sealing gasket further includes an engaging groove extending radially from the inner periphery and located between the first surface and the second surface. An outer periphery of the atomizer is coupled with the insertion groove. The atomizer includes an atomization vibration film located in the gasket through-hole. The electrically conductive module abuts against the first surface of the sealing gasket. The recessed portion of the main cork body further includes a first annular face contiguous to the main cork body through-hole. The second surface of the sealing gasket sealingly abuts against the first annular surface. The atomization vibration film is operable to atomize the liquid in the bottle.

In an example, the atomization bottle cork further includes:

- a main cork body, wherein the bottle includes a chamber receiving the liquid, wherein the main cork body includes an outer surface and an inner surface, wherein the main cork body further includes a recessed portion extending from the outer surface and a main cork body through-hole intercommunicating with the recessed portion and the chamber, wherein the main cork body further includes a passage extending from the outer surface to the inner surface and a coupling portion extending from the inner surface, wherein the coupling portion intercommunicates with the passage and is located on an inner side of the bottle, wherein the passage intercommunicates with the chamber, and wherein the atomizer is received in the recessed portion and seals the main cork body through-hole;
- an auxiliary cork body detachably and sealingly coupled with the passage, wherein the auxiliary cork body includes a stem on an outer side of the outer surface; and
- a one-way valve coupled with the coupling portion, wherein when the auxiliary cork body is coupled with the main cork body, no fluid is permitted to flow between the passage and the chamber of the bottle, wherein when the auxiliary cork body is detached from the main cork body, air outside of the bottle is permitted to flow into the chamber of the bottle, and the liquid in the chamber is prevented from flowing through the passage.

In another aspect, the present invention provides an atomization device comprising:

- a machine body including a groove and an installation portion spaced from the groove, wherein the installation portion receives a control module and a power supply module in electrical connection with the control module;
- an end cover coupled with the machine body and including an opening;
- an electric pole module in electrical connection with the control module and including two electrically conductive members, wherein the electric pole module is mounted to the end cover and is misaligned from the opening; and
- a disposable atomization bottle including:
  - a bottle configured to receive a liquid to be atomized, wherein the bottle is detachably coupled with the groove; and
  - an atomization bottle cork sealingly coupled with the bottle, wherein the atomization bottle cork includes an atomizer free of power and the power module, wherein the atomization bottle cork further includes an electrically conductive module in electrical connection with the atomizer, wherein the electrically conductive module includes two electrically conductive portions, wherein the atomization bottle cork is configured to prevent passage of the liquid but allow atomized tiny water molecules to pass through the atomizer and to be sprayed to an outside of the bottle, wherein when the bottle is coupled with the groove and the two electrically conductive members are in electrical connection with the two electrically conductive portions, the opening of the end cover is aligned with the atomizer, the atomizer is operable under activation by the control module and sprays atomized liquid outwards via the opening of the end cover, and wherein when the bottle is not coupled with the groove, the two electrically conductive members are not in electrical connection with the two electrically conductive portions, the atomizer is not operable, and the opening of the end cover is not aligned with the atomizer.

In an example, the machine body includes an upper side and two pin coupling portions on the upper side. The end cover is pivotably connected to the two pin coupling portions and is pivotable between an open position and an operating position. When the bottle is coupled with the groove and the end cover is in the operating position, the two electrically conductive members are in electrical connection with the two electrically conductive portions, and the bottle is prevented from disengaging from the groove, and the opening of the end cover is aligned with the atomizer.

Due to disposition of electrical connection between the two electrically conductive members of the atomization machine and the two electrically conductive portions of the atomization bottle cork and due to the operation controlled by the atomizer, the atomization bottle can be installed easily.

In an example, the atomization device further comprises:

- a fan mounted to the installation portion, wherein the end cover further includes an air feeding hole spaced from the opening of the end cover, wherein the air feeding hole extends in a direction intersecting with an extending direction of the opening of the end cover, wherein the fan further includes an air outlet, wherein the fan is configured to output air current via the air feeding hole;
- a guiding hood including a coupling end coupled with the air outlet of the fan and a tail end extending through the opening of the machine body, wherein the machine body further includes an upper side and an opening on the upper side, wherein the end cover is pivotable relative to the machine body between an open position and an operating position, wherein when the end cover is in the open position, the tail end of the guiding hood is spaced from the air feeding hole, and wherein when the end cover is in the operating position, the tail end of the guiding hood is contiguous to the air feeding hole, and the two electrically conductive members are in electrical connection with the two electrically conductive portions of the electrically conductive module; and a supporting cover mounted to the end cover and including a passage aligned with the opening of the end cover, wherein the electric pole module is located between the end cover and the supporting cover, wherein a distal end of each of the two electrically conductive members extends beyond the supporting cover, wherein the bottle includes a bottleneck and a chamber receiving the liquid, wherein the chamber includes an opening section located in the bottleneck and intercommunicating with an outside of the bottle, wherein when the end cover is in the operating position, the supporting cover and the electric pole module are on an inner side of the opening section.

In an example, the groove is open. The machine body further includes a lower side spaced from the upper side. The machine body further includes a supporting portion formed on the lower side and contiguous to the groove. The bottle includes a bottom. When the bottle is coupled with the groove, the bottom of the bottle abuts against the supporting portion. When the end cover is in the operating position, the supporting portion cooperates with the supporting cover to prevent the bottle from disengaging from the groove.

In an example, the machine body further includes a first side and a second side. The machine body further includes upper and lower sides extending between the first and second sides and spaced from each other. The installation portion is formed on the second side. The machine body further includes a supporting portion protruding from the first side. The supporting portion includes a bottom end face located between the upper side and the lower side. The groove extends from the upper side to the bottom end face. When the atomization bottle is coupled with the groove, the atomization bottle cork faces the bottom side.

In an example, the atomization device further comprises:

a fan mounted to the installation portion, wherein the machine body further includes an air output hole on the first side, wherein the air output hole extends in a direction intersecting with an extending direction of the opening of the end cover, wherein the fan further includes an air outlet intercommunicating with the air output hole; and a supporting cover mounted to the end cover and including a passage aligned with the opening of the end cover, wherein the end cover is mounted to the bottom end face of the supporting portion, wherein the supporting cover includes an opening intercommunicating with the groove, wherein the electric pole module is located between the end cover and the supporting cover, wherein a distal end of each of the two electrically conductive members extends beyond the supporting cover, wherein the bottle includes a bottleneck and a chamber receiving the liquid, wherein the chamber includes an opening section located in the bottleneck and intercommunicating with an outside of the bottle, wherein when the bottle is coupled with the groove, the supporting cover is located in the opening section.

In an example, the atomization device further comprises:

a main cork body, wherein the bottle includes a chamber receiving the liquid and a bottleneck, wherein the chamber includes an opening section located in the bottleneck and intercommunicating with an outside of the bottle, wherein the main cork body includes an outer periphery sealingly coupled with the opening section and an outer surface extending towards the outside of the bottle, wherein the main cork body further includes a recessed portion extending from the outer surface and a main cork body through-hole intercommunicating with the recessed portion and the chamber, wherein the atomizer is received in the recessed portion and seals the main cork body through-hole; and a cap sealingly and detachably coupled with the bottleneck, wherein when the cap is not detached, the atomization bottle cork is sealed, and electrical connection with the two electrically conductive portions is prevented, and wherein when the cap is detached, the atomization bottle cork is exposed to permit electrical connection with the two electrically conductive portions.

In an example, the electrically conductive module is received in the recessed portion. The atomizer is located between the electrically conductive module and the main cork body through-hole. The electrically conductive module includes a module through-hole aligned with the main cork body through-hole. The electrically conductive module further includes a first side and a second side spaced from the first side. The second side faces the atomizer. The module through-hole extends from the first side through the second side. Two electrically conductive portions are formed on the first side. The electrically conductive module further includes two contacts extending from the two electrically conductive portions to the second side. The atomizer includes an atomization vibration film aligned with the module through-hole and the main cork body through-hole. The atomizer is in electrical connection with the two contacts.

In an example, the atomization bottle cork further includes:

a supporting tube including an engaging end and a closed end, wherein the supporting tube further includes a receiving chamber extending from the engaging end towards but spaced from the closed end, wherein the main cork body further includes an inner face spaced from the outer surface in an axial direction of the main cork body through-hole, wherein the main cork body further includes a coupling skirt extending from the inner surface and defining a hole intercommunicating with the main cork body through-hole, wherein the engaging end of the supporting tube is coupled with the coupling skirt of the main cork body, wherein the closed end of the supporting tube extends into the chamber of the bottle, and wherein the liquid enters the receiving chamber;

a delivery member received in the receiving chamber of the supporting tube, wherein the delivery member includes an outer end abutting against the atomizer, wherein the delivery member further includes an inner end spaced from the outer end, and wherein the delivery member is configured to deliver the liquid to the atomizer; and a supporting spring, wherein the supporting spring is disposed between the closed end of the supporting tube and the inner end of the delivery member and is configured to support the outer end of the delivery member to abut against the atomizer, and wherein the delivery member delivers the liquid in the chamber towards atomizer under capillary action.

In an example, the atomization bottle cork further includes a sealing gasket received in the recessed portion. The sealing gasket includes first and second surfaces spaced from each other in the axial direction of the main cork body through-hole. The sealing gasket further includes a gasket through-hole extending from the first surface through the second surface. The gasket through-hole has an inner periphery. The sealing gasket further includes an engaging groove extending radially from the inner periphery and located between the first surface and the second surface. An outer periphery of the atomizer is coupled with the insertion groove. The atomizer includes an atomization vibration film received in the gasket through-hole. The electrically conductive module abuts against the first surface of the sealing gasket. The recessed portion of the main cork body further includes a first annular face contiguous to the main cork body through-hole. The second surface of the sealing gasket sealingly abuts against the first annular surface. The atomization vibration film is operable to atomize the liquid in the bottle.

In an example, the atomization bottle cork further includes:

- a main cork body, wherein the bottle includes a chamber receiving the liquid, wherein the main cork body includes an outer surface and an inner surface, wherein the main cork body further includes a recessed portion extending from the outer surface and a main cork body through-hole intercommunicating with the recessed portion and the chamber, wherein the main cork body further includes a passage extending from the outer surface to the inner surface and a coupling portion extending from the inner surface, wherein the coupling portion intercommunicates with the passage and is located on an inner side of the bottle, wherein the passage intercommunicates with the chamber, and wherein the atomizer is received in the recessed portion and seals the main cork body through-hole;
- an auxiliary cork body detachably and sealingly coupled with the passage, wherein the auxiliary cork body includes a stem on an outer side of the outer surface; and
- a one-way valve coupled with the coupling portion, wherein when the auxiliary cork body is coupled with the main cork body, no fluid is permitted to flow between the passage and the chamber of the bottle, wherein when the auxiliary cork body is detached from the main cork body, air outside of the bottle is permitted to flow into the chamber of the bottle, and the liquid in the chamber is prevented from flowing through the passage.

In an example, the machine body further includes a stop wall on an outer side of the groove and a first magnetic member in the stop wall. The end cover includes a wall extension corresponding to the stop wall and a second magnetic member disposed in the wall extension. The end cover is pivotable between an open position and an operating position. When the bottle is coupled with the groove and the end cover is in the open position, the first and second magnetic members are away from each other, and the bottle is disengageable from the groove. When the bottle is coupled with the groove and the end cover is in the operating position, the two electrically conductive members are in electrical connection with the two electrically conductive portions, and the first and second magnetic members attract each other, reliably retaining the end cover in the operating position.

The present invention will become clearer in light of the following detailed description of illustrative embodiments of this invention described in connection with the drawings.

Figure 1:
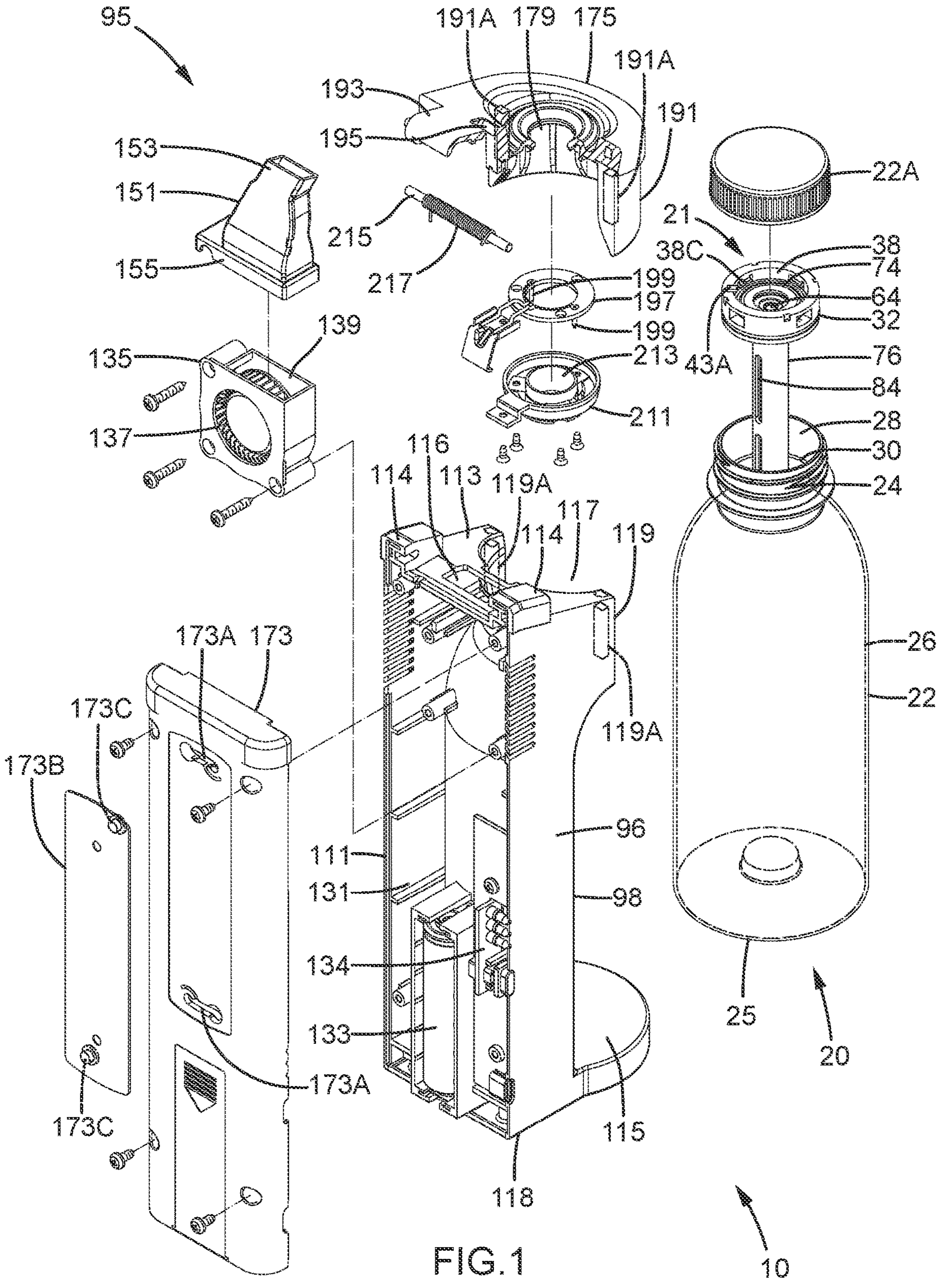
FIG. 1 is an exploded, perspective view of an atomization device of a first embodiment according to the present invention.
Figure 2:
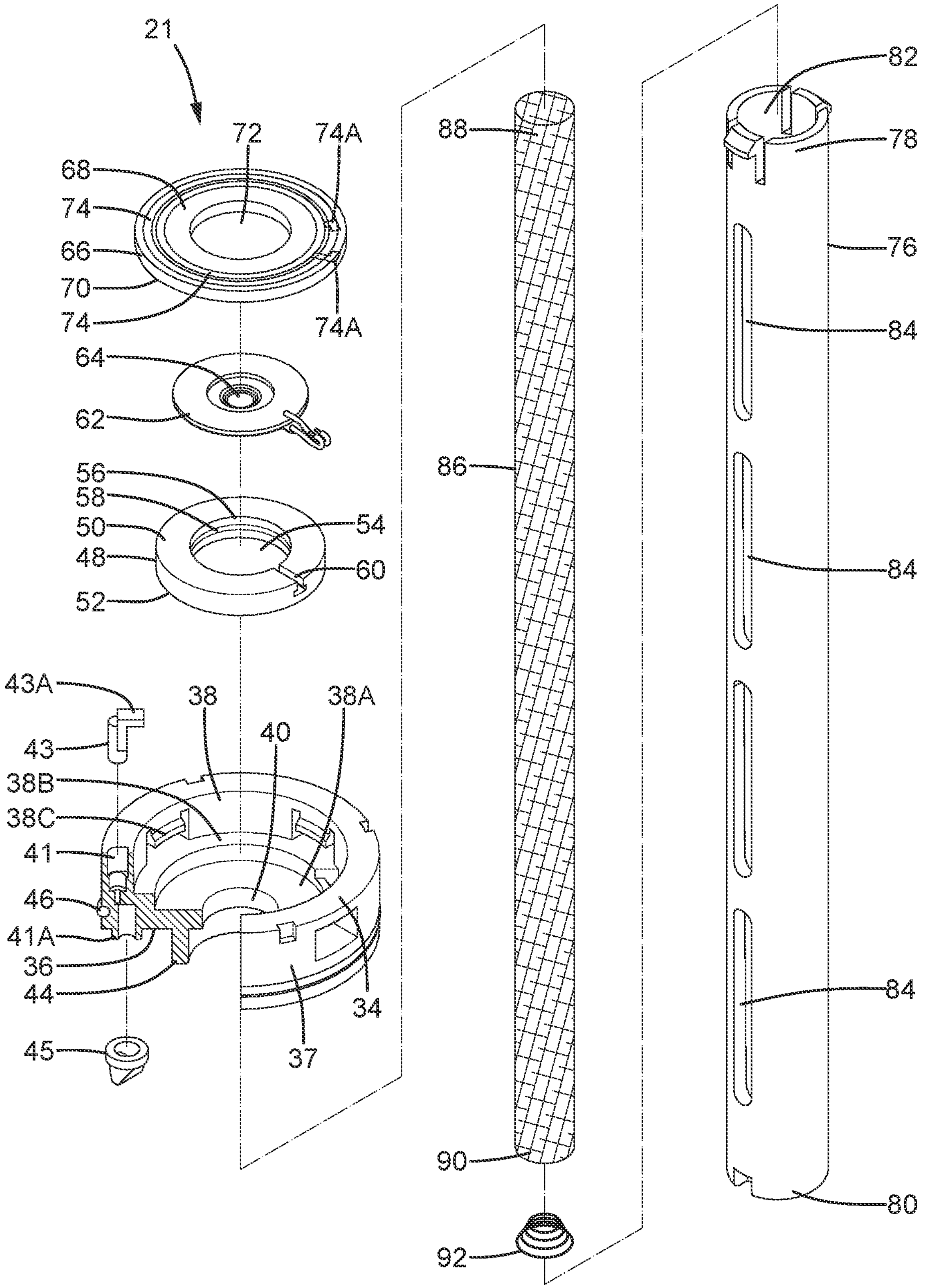
FIG. 2 is an exploded, perspective view of an atomization bottle cork according to the present invention.
Figure 3:
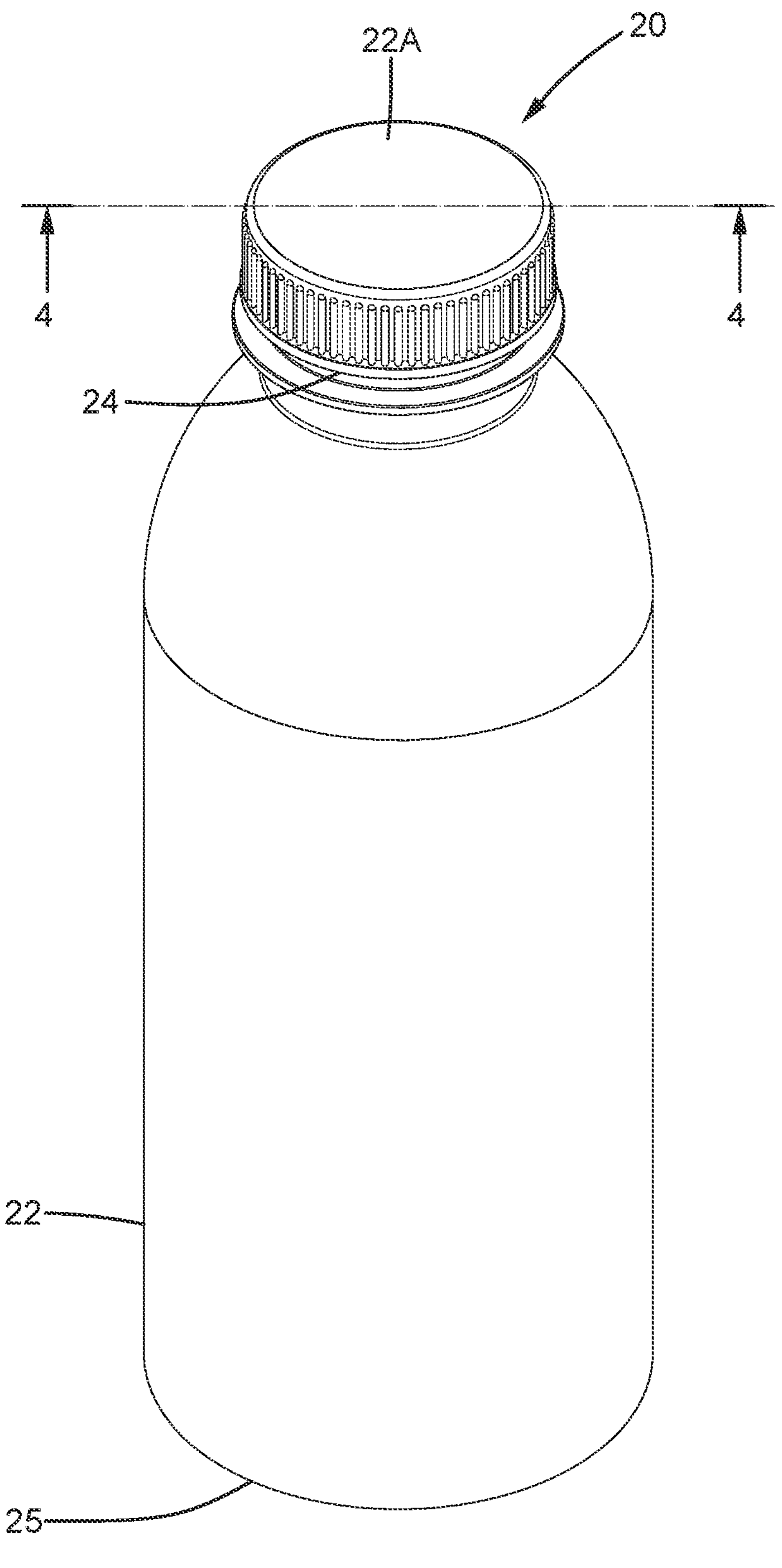
FIG. 3 is a perspective view of an atomization bottle according to the present invention after assembly.

All figures are drawn for ease of explanation of the basic teachings of the present invention only; the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms “first”, “second”, “lower”, “upper”, “inner”, “outer”, “side”, “end”, “portion”, “section”, “longitudinal”, “axial”, “radial”, “annular”, “outward”, “inward”, and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

The present invention relates to a liquid atomization device (hereinafter “atomization device”) used to atomize a liquid (such as water, an aqueous solution containing water and an essence oil, etc.) into a mist that can be sprayed into the air. With reference to FIGS. 1-7, an atomization device 10 of a first embodiment according to the present invention comprises an atomization machine 95 and an atomization bottle 20. The atomization bottle 20 may be of a cheap, disposable design similar to a disposable ink cartridge of a printer. Namely, the atomization bottle 20 can be directly discarded after it is completely used. The atomization bottle 20 is difficult to be recycled and reused by a consumer lacking of the skill of refilling a new liquid into the atomization bottle 20. The atomization bottle 20 includes a bottle 22. The bottle 22 includes a bottleneck 24 and a bottom 25 spaced from the bottleneck 24. An outer threading is formed on an outer periphery of the bottleneck 24. The bottle 22 further includes a chamber 26 therein. The chamber 26 includes an opening section 28 intercommunicating with the outside of the bottle 22. The opening section 28 has a stepped face 30.

A liquid may be filled into the chamber 26 via the opening 28 and the bottleneck 24 of the bottle 22. The liquid may be pure water, water, or an aqueous solution containing water, essence oil, essence, and/or other ingredients.

The atomization bottle 20 further includes an atomization bottle cork 21 sealingly coupled with the bottle 22. The atomization bottle cork 21 includes a main cork body 32. The main cork body 32 includes an outer surface 34, an inner surface 36 spaced from the outer surface 34 in an axial direction of the opening section 28 of the bottle 22, and an outer periphery 37 extending between the inner surface 36 and the outer surface 34. The main cork body 32 further includes a recessed portion 38 extending inwards from the outer surface 34 towards but spaced from the inner surface 36 and a main cork body through-hole 40 extending from the inner surface 36 to the recessed portion 38. The recessed portion 38 is substantially comprised of two annular grooves which are concentric to each other but have different inner diameters. The recessed portion 38 further includes a first annular face 38A and a second annular face 38B. The recessed portion 38 further includes a plurality of inner protrusions 38C on an inner periphery thereof. Specifically, the first annular face 38A is located between the second annular face 38B and the plurality of protrusions 38C in the axial direction of the main cork body through-hole 40. The main cork body 32 further includes a coupling skirt 44 extending from the inner surface 36 and defining a hole intercommunicating with the main cork body through-hole 40. The main cork body 32 further includes a passage 41 extending from the outer surface 34 through the inner surface 36 and a coupling portion 41A extending from the inner surface 36. The passage 41 is comprised of at least two holes that have different axes and that may have different inner diameters. Thus, the passage 41 is zigzag. The coupling portion 41A is spaced from the coupling skirt 44 and intercommunicates with the passage 41.

Figure 4:
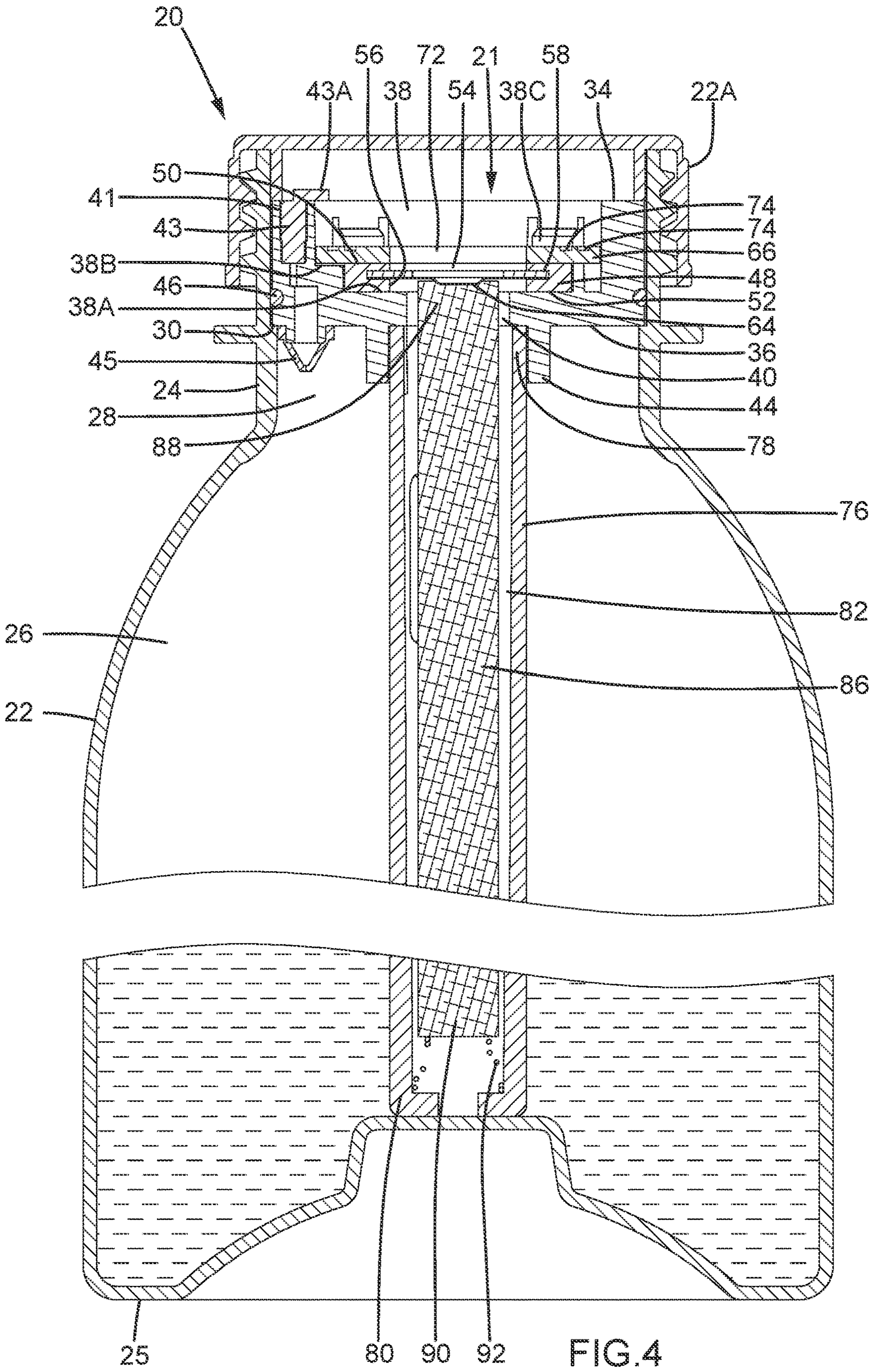
FIG. 4 is a cross sectional view taken along section line 4-4 of FIG. 3.
Figure 6:
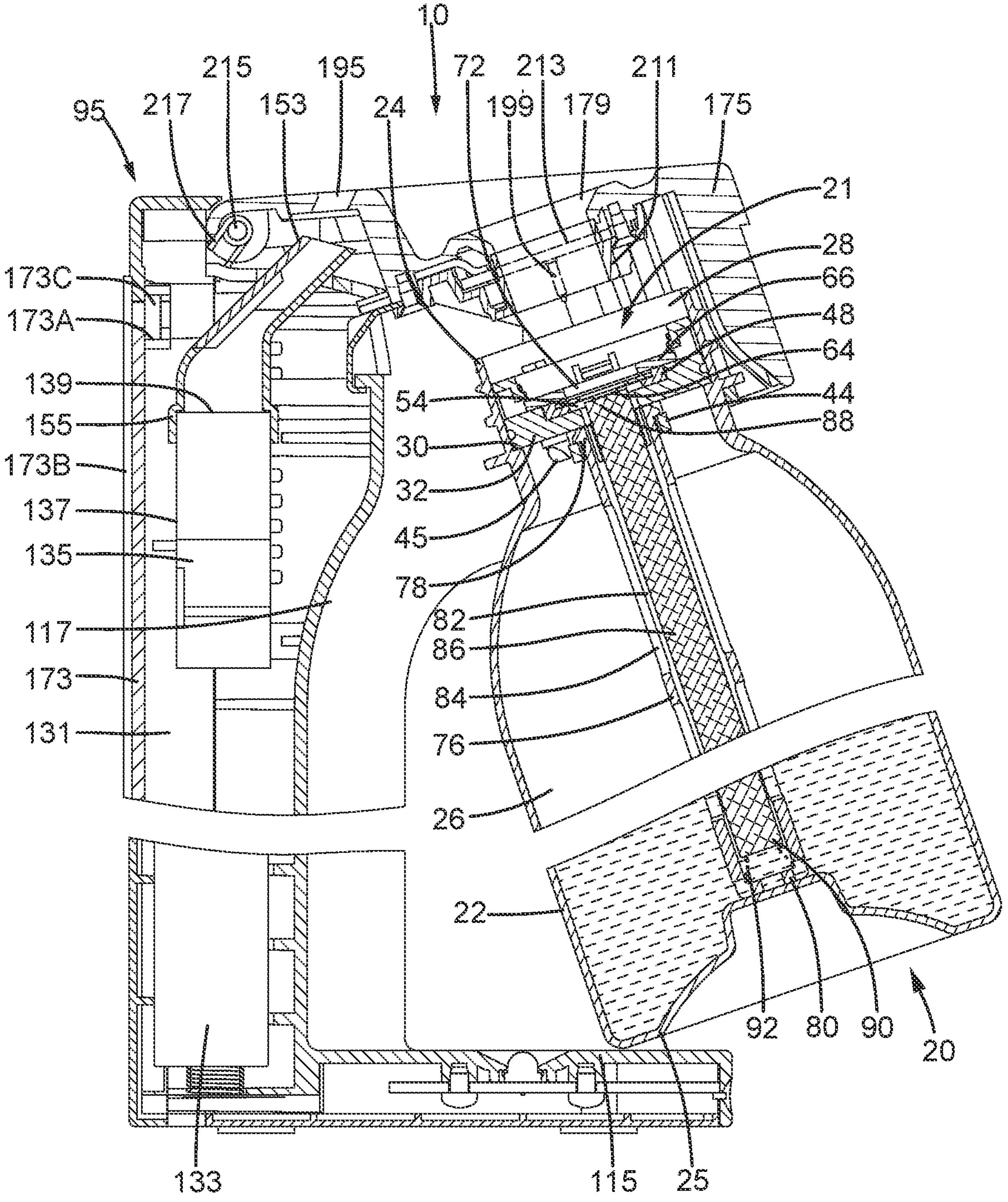
FIG. 6 is a cross sectional view taken along section line 6-6 of FIG. 5.

The main cork body 32 is inserted into the opening section 28 of the bottle 22. The inner surface 36 abuts the stepped face 30. The outer surface 34 of the main cork body 32 is spaced from a distal end of the bottleneck 24 in the axial direction of the opening section 28 and is located in the opening section 28, as shown in FIGS. 4 and 6. Furthermore, the outer periphery 37 of the main cork body 32 completely abuts the inner periphery of the opening section 28. In a preferred state, a sealing ring 46 made of rubber is disposed on the outer periphery 37 of the main cork body 32 to enable a sealing contact between the outer periphery 37 of the main cork body 32 and the bottleneck 24 of the bottle 22.

Figure 5:
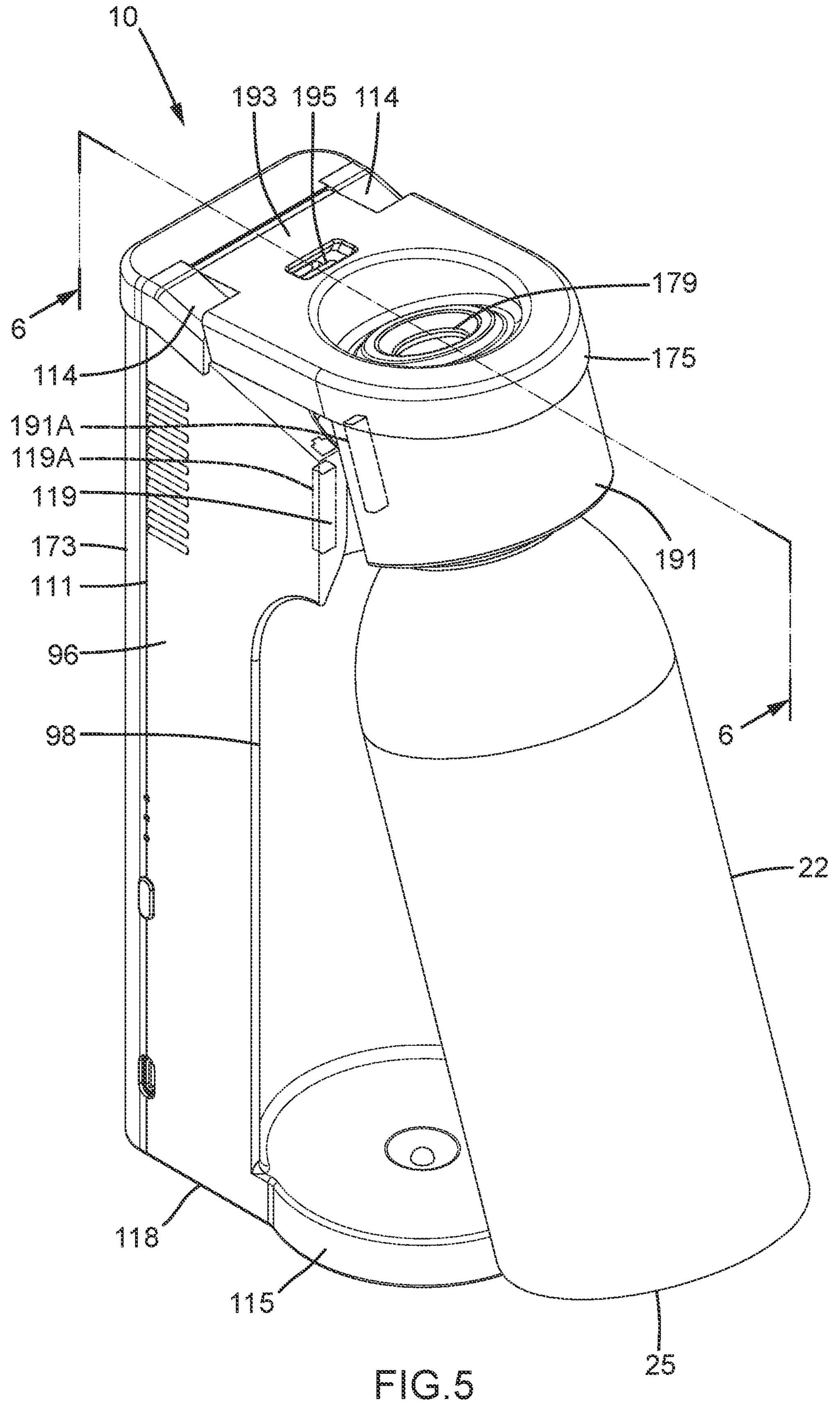
FIG. 5 is a perspective view of the atomization device according to the present invention, with the atomization bottle placed in a groove of an atomization machine and with an end cover in an open position.

The atomization bottle cork 21 further includes an auxiliary cork body 43 coupled with the main cork body 32 and a one-way valve 45. The auxiliary cork body 43 includes a stem 43A on a distal end thereof. The auxiliary cork body 43 is inserted from the outer surface 34 into the passage 41. The auxiliary cork body 43 is used to sealingly close the passage 41, such that no fluid (such as air or liquid) can pass through the main cork body 32 via the passage 41. The one-way valve 45 is coupled with the coupling portion 41A and is located in the opening section 28, as shown in FIG. 5. The one-way valve 45 permits a fluid to flow from the passage 41 towards the chamber 26 and prevents the fluid to flow from the chamber 26 into the passage 41.

The atomization bottle cork 21 further includes a sealing gasket 48 disposed in the recessed portion 38 and made of rubber or silicone. The sealing gasket 48 includes first and second surfaces 50 and 52 spaced from each other in an axial direction of the main cork body through-hole 40. The sealing gasket 48 further includes a gasket through-hole 54 extending from the first surface 50 through the second surface 52. The gasket through-hole 54 includes an inner periphery 56. The sealing gasket 48 further includes an engaging groove 58 which is annular and extends radially from the inner periphery 56. The sealing gasket 48 further includes a notch 60 recessed in the first surface 50 and intercommunicating with the gasket through-hole 54.

The sealing gasket 48 is received in the recessed portion 38. The second surface 52 sealingly abuts the first annular face 38A. The first surface 50 is located above the second annular face 38B in the axial direction of the main cork body through-hole 40. The main cork body through-hole 40 is aligned with the gasket through-hole 54.

The atomization bottle cork 21 further includes an atomizer 62 and an electrically conductive module 66. The atomizer 62 does not include power and any control module. The atomizer 62 includes an atomization vibration film 64 in a central portion thereof. The atomization vibration film 64 can generate high-frequency vibrations under power supply and driven by a control module. Namely, mere power supply cannot operate the atomizer 62. Furthermore, the atomization vibration film 64 includes a plurality of tiny holes with a diameter of about 5 μm.

An outer periphery of the atomizer 62 is engaged with the engaging groove 58 of the sealing gasket 48. Furthermore, the atomization vibration film 64 is located on the inner side of the gasket through-hole 54. Thus, the atomizer 62 cooperates with the sealing gasket 48 to seal the main cork body through-hole 40, as shown in FIG. 4. Specifically, since the hole diameter of the atomizer 64 is smaller than the size of the molecules of the liquid in the chamber 26, the liquid in the chamber 26 cannot pass through the atomization vibration film 64. Furthermore, the atomizer 62 includes two wires extending through the notch 60 to the outer side of the sealing gasket 48.

The electrically conductive module 66 includes first and second sides 68 and 70 spaced from each other in the axial direction of the main cork body through-hole 40 and a module through-hole 72 extending from the first side 68 through the second side 70. Two electrically conductive portions 74 are disposed on the first side 68 and are spaced from each other. An end of each of the two electrically conductive portions 74 extends to the second side 70 to form a contact 74A.

The electrically conductive module 66 is received in the recessed portion 38. The second side 70 abuts the first surface 50 of the sealing gasket 48. The first side 68 of the electrically conductive module 66 is pressed by the plurality of protrusions 38C. Thus, the sealing gasket 48 is sandwiched between the electrically conductive module 66 and the first annular face 38A. Furthermore, the module through-hole 72 is aligned with the atomization vibration film 64. The two contacts 74A are in electrical connection with the atomizer 62.

The atomization bottle cork 21 further includes a supporting tube 76 and a delivery member 86 which are coupled with the main cork body 32. The supporting tube 76 includes a coupling end 78 and a closed end 80 spaced from the coupling end 78 in the axial direction of the main cork body through-hole 40. The supporting tube 76 further includes a receiving chamber 82 extending from the coupling end 78 and terminating at the closed end 80. The supporting tube 76 further includes a plurality of slots 84 extending from an outer surface thereof to the receiving chamber 82. The supporting tube 76 is received in the chamber 26 of the bottle 22 and is immersed in the liquid. The coupling end 78 is coupled with the coupling skirt 44 of the main cork body 32. The closed end 80 abuts the bottom 25 of the bottle 22. The liquid in the chamber 26 enters the receiving chamber 82 of the supporting tube 76 via the plurality of slots 84.

The delivery member 86 includes inner and outer ends 90 and 88 spaced from each other in the axial direction of the main cork body through-hole 40. The delivery member 86 is preferably made of a material (such as cotton) with a capillary function. The delivery member 86 is received in the receiving chamber 82 of the supporting tube 76. Furthermore, a supporting spring 92 is disposed between the inner end 90 of the delivery member 86 and the closed end 80 of the supporting tube 76. The supporting spring 92 biases the outer end 88 of the delivery member 86 to abut against the atomization vibration film 64 of the atomizer 62. Under the capillary action, the liquid in the chamber 26 can be delivered towards the outer end 88 and come in contact with the atomization vibration film 64.

After the atomization bottle cork 21 is sealingly inserted into the opening section 28 of the bottle 22, the liquid in the chamber 26 of the bottle 22 cannot enter the atomization bottle cork 21 to the outside of the bottle 22. Furthermore, the bottleneck 24 is in threading connection with a cap 22A to seal the opening section 28. This further assures leakage of the liquid in the chamber 26 to the outside of the bottle 22 while reliably avoiding dust and impurities from contacting or contaminating the atomization vibration film 64 and the electrically conductive portions 74.

The atomization bottle 20 must cooperate with an atomization machine 95. The atomization machine 95 includes a machine body 96 which has spaced first and second sides 98 and 111. The body 96 further includes upper and lower sides 113 and 118 extending between the first and second sides 98 and 111 and spaced from each other.

The machine body 96 further includes a groove 117 and a supporting member 115 which are disposed on the first side 98. The groove 117 is open and extends to the upper side 113. The supporting portion 115 is contiguous to the groove 117 and is located on the lower side 118. The machine body 96 further includes an installation portion 131 extending from the second side 111. The machine body 96 further includes two pin coupling portions 114 disposed on the upper side 113 and in the form of protrusions. The machine body 96 further includes an opening 116 extending between the two pin coupling portions 114. The opening 116 extends to the installation portion 131. The machine body 96 further includes two stop walls 119 on two sides of the groove 117. Each of the two stop walls 119 has a first magnetic member 119A in an inner side thereof. Each first magnetic member 119A may be in the form of a magnet.

The installation portion 131 receives a power supply module 133 and a control module 134 in electrical connection with the power supply module 133. The power supply module 133 may be comprised of batteries or chargeable batteries.

Furthermore, a side cover 173 is screwed to the second side 111 of the machine body 96 to seal the installation portion 131. The side cover 173 includes two insertion grooves 173A spaced from each other. The side cover 173 is detachably coupled with a hanger board 173B. The hanger board 173B includes two blocks 173C which are protrusive and located corresponding to the two insertion grooves 173A. The hanger board 173 may be screwed to a wall or the like, and the atomization machine 95 can be coupled with the hanger board 173B via detachably coupling between the two insertion grooves 173A and the two blocks 173C.

The atomization machine 95 further includes a fan 135 and a guiding hood 151 which are mounted in the installation portion 131. The fan 135 includes an air inlet 137 on a side thereof and an air outlet 139 on an end face thereof. The fan 135 is in electrical connection with the control module 134. The guiding hood 151 includes coupling end 155 and a tail end 153 smaller than the coupling end 155. The coupling end 155 of the guiding hood 151 is coupled with the air outlet 139 of the fan 135. The tail end 153 extends from the opening 116 to the outside of the machine body 96.

The atomization machine 95 further includes an end cover 175 coupled with the machine body 96. The end cover 175 includes a pivotal portion 193 on an end thereof and a wall extension 191 extending from a lower surface thereof. The end cover 175 further includes an opening 179 and an air feeding hole 195. The air feeding hole 195 is located between the opening 179 and the pivotal portion 193 and extends in a direction intersecting with an extending direction of the opening 179. Two second magnetic members 191A are disposed in the wall extension 191 and located corresponding to the two stop walls 119.

Figure 7:
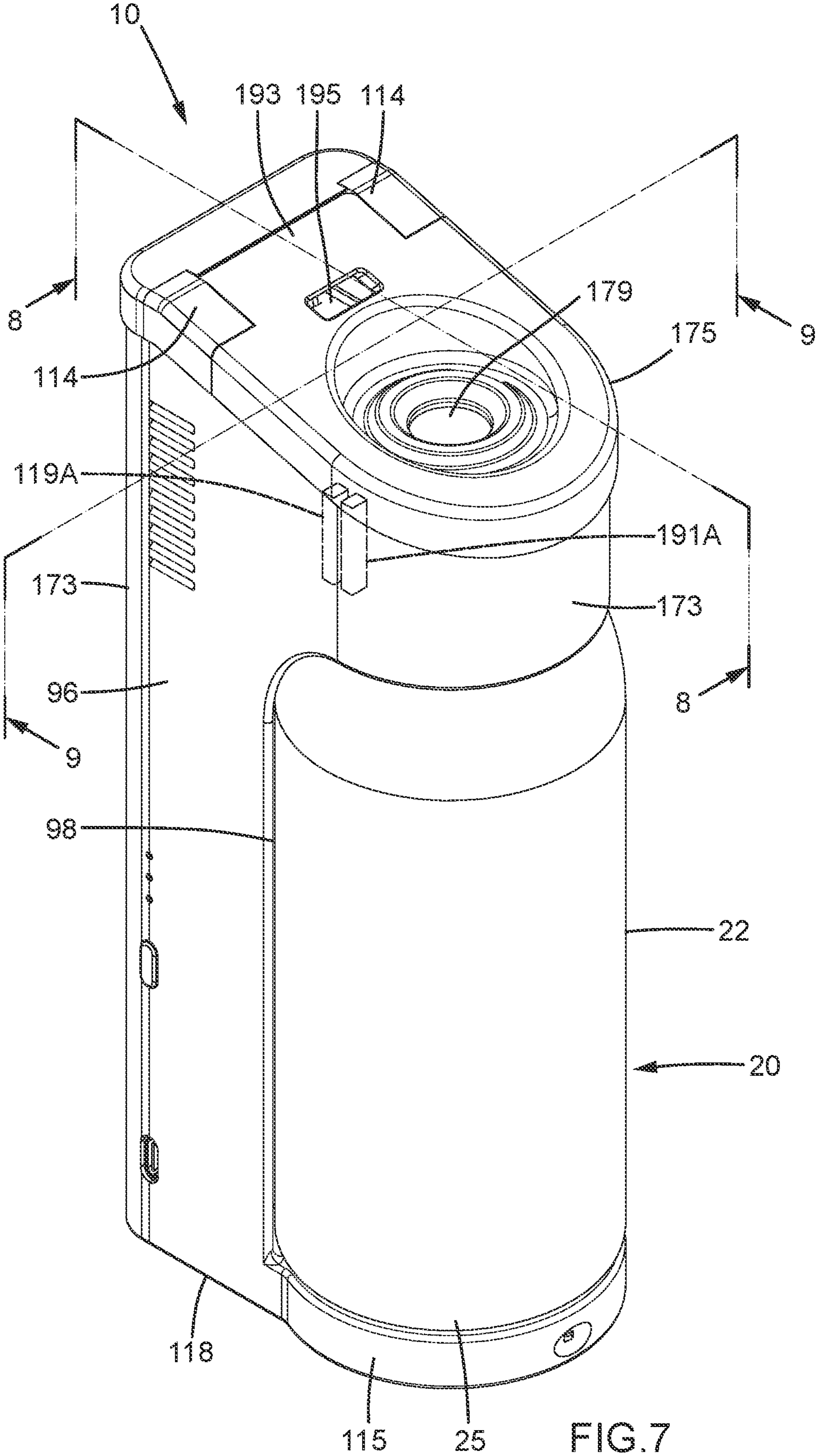
FIG. 7 is a perspective view of the atomization device according to the present invention, with the atomization bottle placed in the groove of an atomization machine and with the atomization bottle in an operating position.
Figure 8:
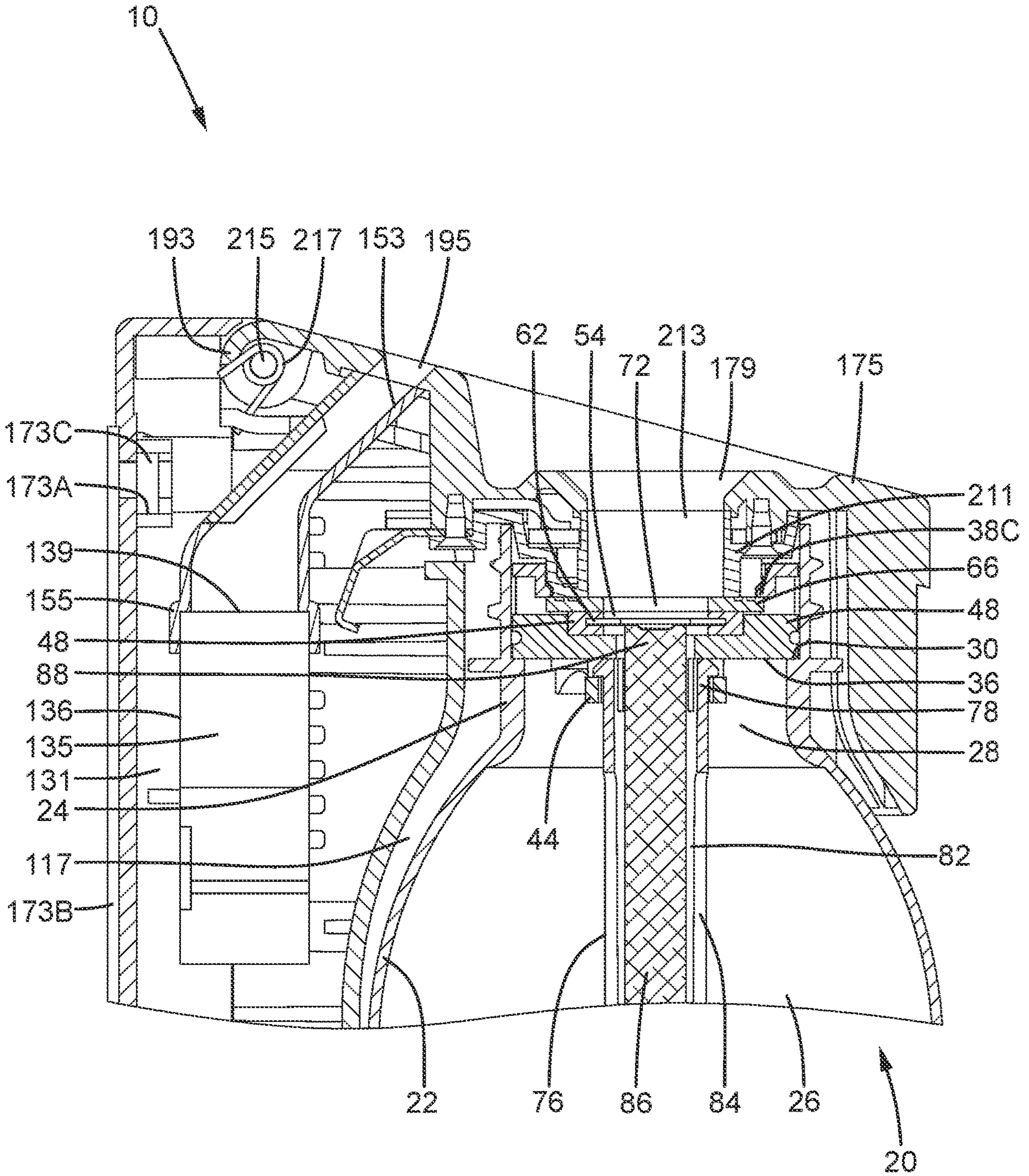
FIG. 8 is a cross sectional view taken along section line 8-8 of FIG. 7.
Figure 9:
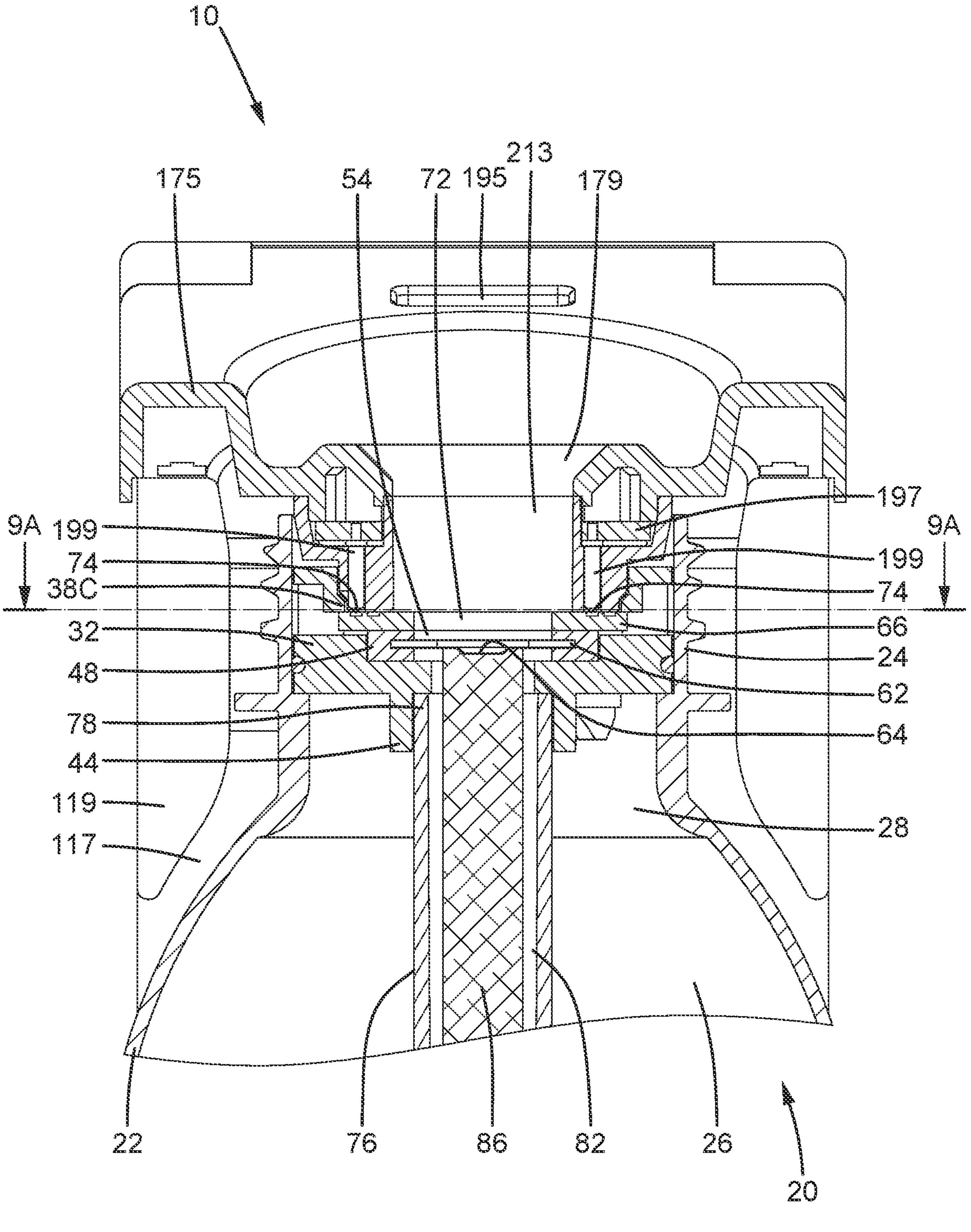
FIG. 9 is a cross sectional view taken along section line 9-9 of FIG. 7.

The end cover 175 is pivotably connected to the two pin coupling portions 114 of the machine body 96 and, thus, is pivotable between an open position (FIGS. 5 and 6) and an operating position (FIGS. 7-9). A pin 215 extends through the pivotal portion 193 and the two pin coupling portions 114. A torsion spring 217 is disposed around the pin 215. The torsion spring 217 biases the end cover 175 towards the operating position, such that the end cover 175 remains in the open position when the atomization bottle 20 is not installed on the atomization machine 95, providing easy installation of the atomization bottle 20.

Figure 9A:
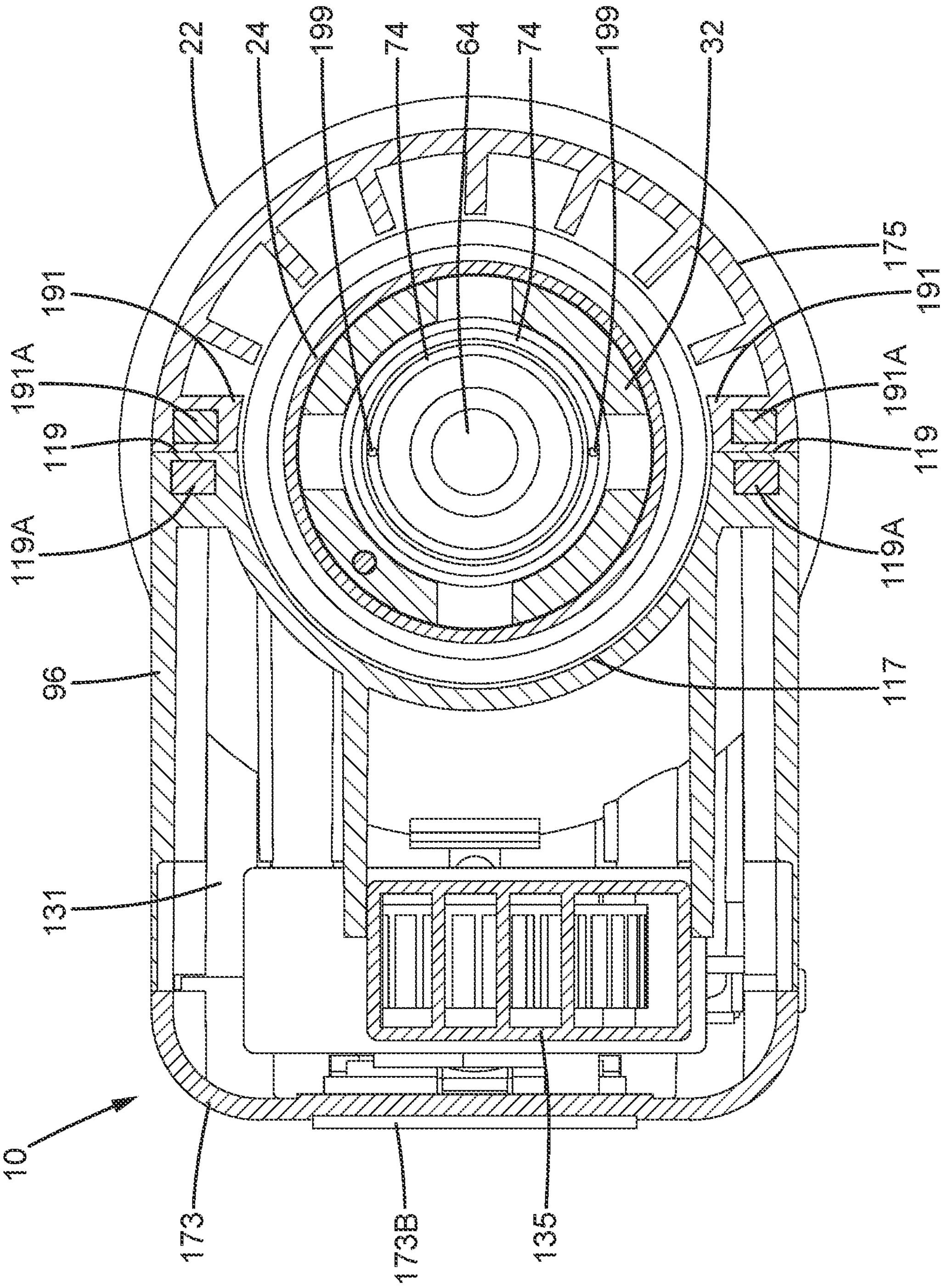
FIG. 9A is a cross sectional view taken along section line 9A-9A of FIG. 9.

For the sake of explanation, it will be assumed that the atomization bottle 20 is to be installed on the atomization machine 95. Firstly, the cap 22A of the atomization bottle 20 is opened to reveal the opening section 28. Thus, the two electrically conductive portions 74 of the atomization bottle cork 21, the atomization vibration film 64, and the stem 43A of the auxiliary cork body 43 are exposed. Then, the stem 43A of the auxiliary cork body 43 is held by fingers to remove the auxiliary cork body 43 from the main cork body 32 to thereby open the passage 41. Thus, a pressure balance between the chamber 26 of the bottle 22 and the outside of the bottle 22 can achieved. Next, the bottleneck 24 of the atomization bottle 20 is placed into the inner side of the wall extension 191 of the end cover 175, and the end cover 175 is moved from the operating position to the open position, such that the bottom portion 25 of the bottle 22 is slightly higher than the supporting portion 115, permitting insertion of the atomization bottle 20 into the groove 117. The bottom 25 of the bottle 22 abuts against the supporting portion 115. In this state, since the end cap 175 is retained in the operating position under the bias of the torsion spring 217 and since the two first magnetic members 119A and the two second magnetic members 191A attract each other (see FIG. 9A), the supporting cover 211 is received in the opening section 28 and the recessed portion 38, and the two electrically conductive members 199 are tightly and electrically connected with the two electrically conductive portions 74.

Furthermore, when the end cover 175 is in the operating position, the atomizer 62 in the atomization bottle cork 21 is in electrical connection with the power supply module 133 and the control module 134 via the two electrically conductive members 199. Thus, the control module 134 can use the power from the power supply 133 to activate the atomizer 62 while driving the fan 135 to rotate. When the atomizer 62 operates, the atomization vibration film 64 generates high frequency vibrations to separate the liquid adjacent to the outer end 88 of the delivery member 86 into tiny droplets of a diameter smaller than 5 μm, thereby forming a mist. Furthermore, these tiny droplets can pass through the tiny holes of the atomization vibration film 64, and these tiny droplets passing through the atomization vibration film 64 can be sprayed to the outside of the bottle 22 by the high frequency vibrations. Furthermore, the air current produced from the fan 135 carries the mist away from the atomization machine 95.

After the liquid in the atomization bottle 20 is used up, the atomization bottle 20 is pushed towards the open position, such that the end cover 175 pivots from the operating position (FIGS. 7-9) to the open position (FIGS. 5 and 6), such that the bottleneck 24 of the atomization bottle 20 can be separated from the supporting cover 211. Then, the used atomization bottle 20 can be removed from the atomization machine 95 and can be substituted by a new atomization bottle 20.

Figure 10:
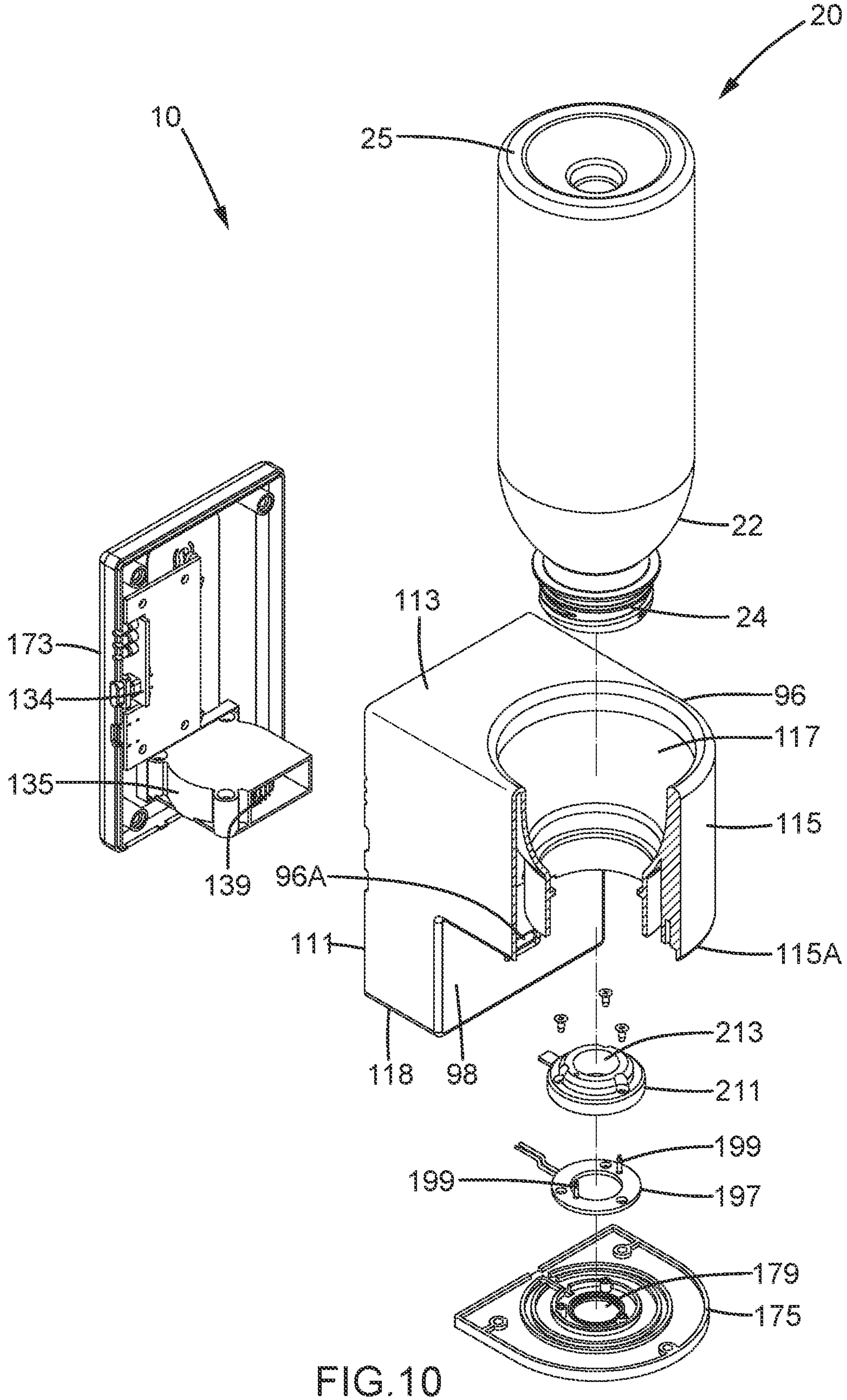
FIG. 10 is an exploded, perspective view of an atomization device of a second embodiment according to the present invention.
Figure 11:
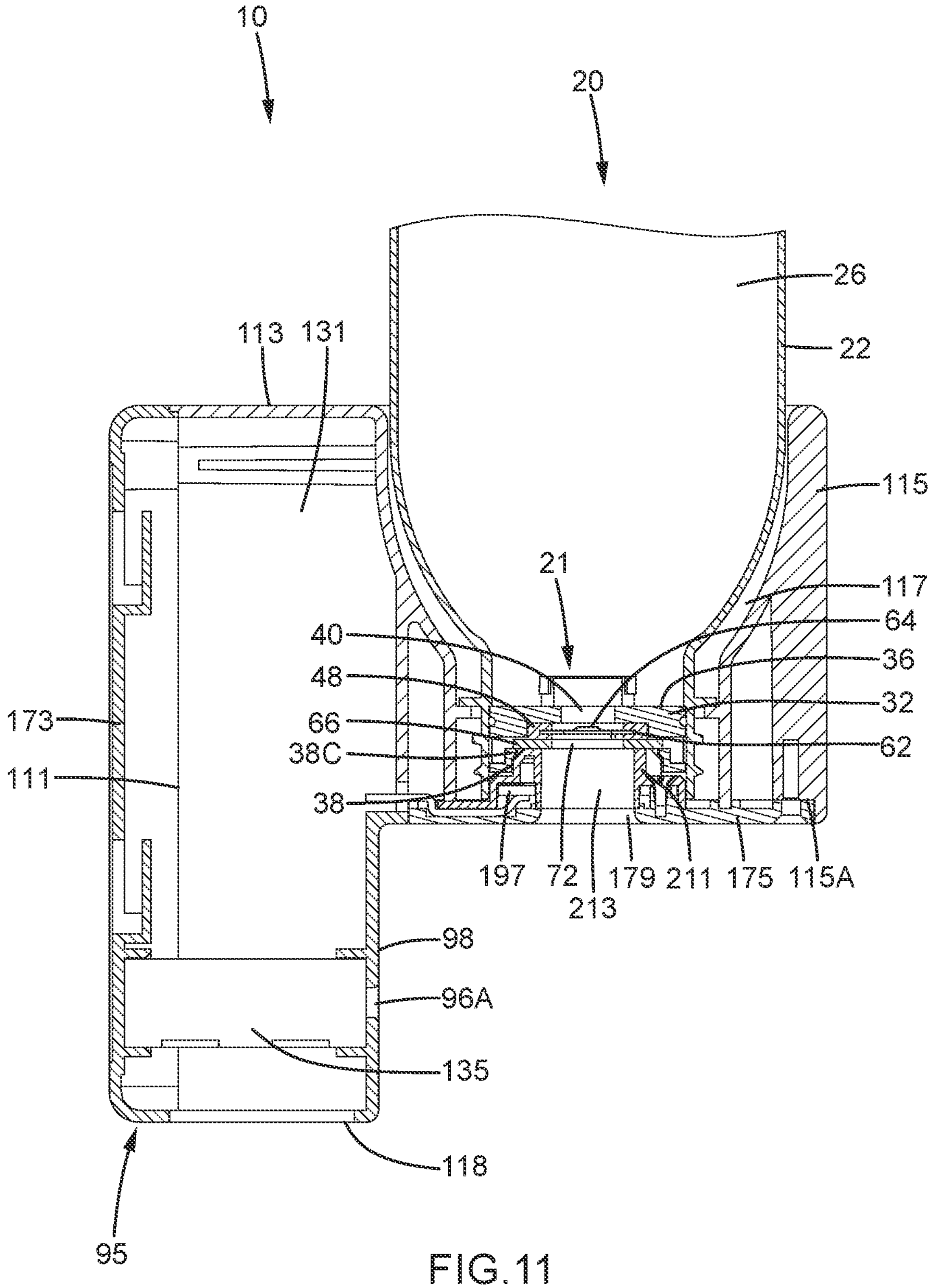
FIG. 11 is a longitudinal cross sectional view of the atomization device of the second embodiment according to the present invention.
Figure 12:
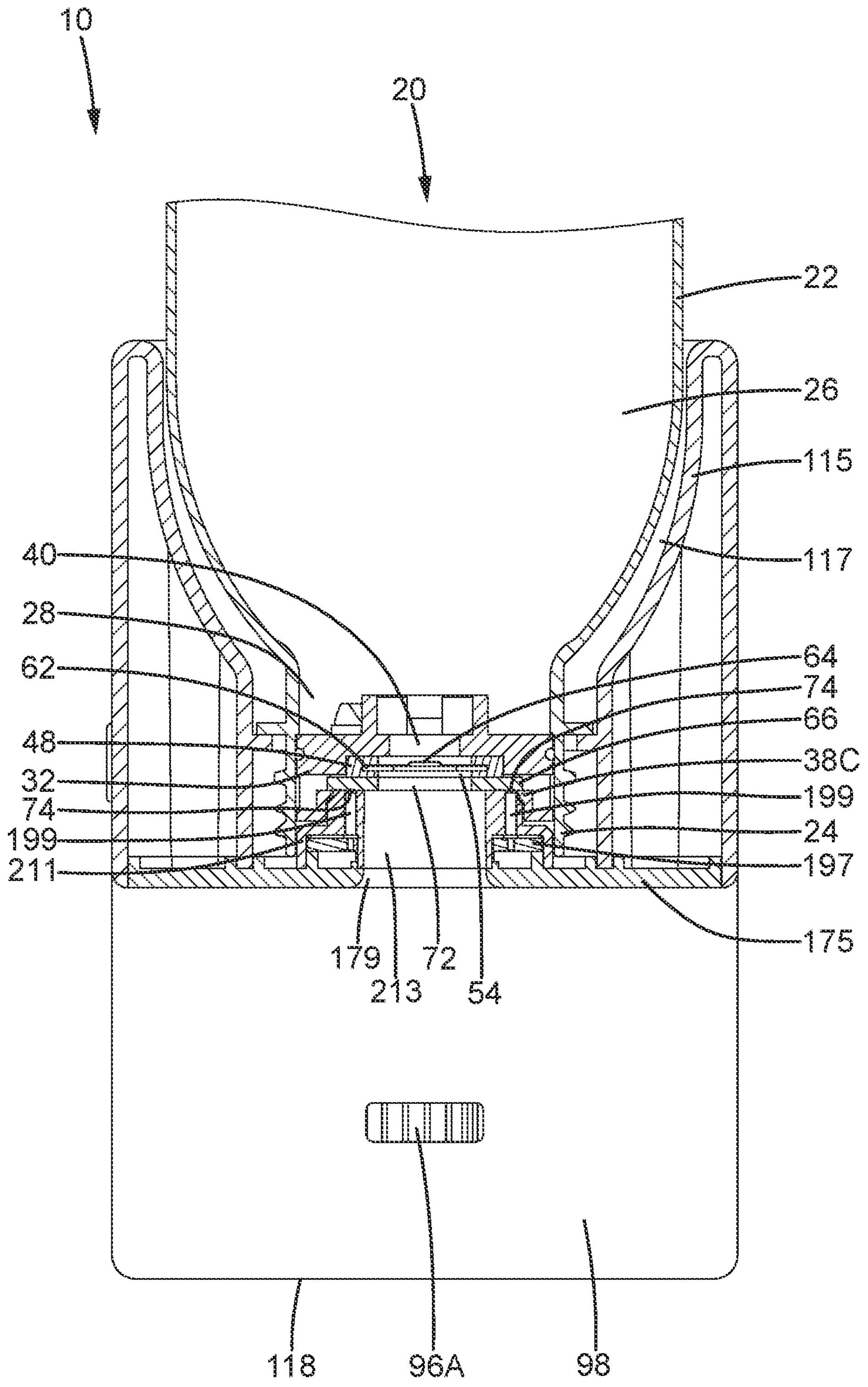
FIG. 12 is another longitudinal cross sectional view of the atomization device of the second embodiment according to the present invention.

Apart from the first embodiment illustrated in FIGS. 1-9, the atomization device 10 according to the present invention may also have changes. With reference to FIGS. 10-12 illustrating an atomization device 10 of a second embodiment, only the portions different from the first embodiment will be set forth to avoid redundancy. In comparison with the first embodiment, the atomization bottle 20 in the second embodiment is disposed upside down. Namely, the bottleneck 24 of the atomization bottle 20 in the first embodiment faces upwards when in use, whereas the bottleneck 24 of the atomization bottle 20 of the second embodiment faces downwards when in use. Since the bottleneck 24 of the atomization bottle 20 faces downwards when in use, the atomization bottle cork 21 does not include the supporting tube 76 and the delivery member 86 (see FIG. 11).

Furthermore, in order to support the upside-down use of the atomization bottle 20, the atomization machine 95 is also adjusted accordingly. The machine body 96 of the atomization machine 95 of the second embodiment includes first and second sides 98 and 111 spaced from each other. The machine body 96 further includes upper and lower sides 113 and 118 extending between the first and second sides 98 and 1 and spaced from each other.

The machine body 96 of the second embodiment further includes a supporting portion 115 on the first side 98. The supporting portion 115 is adjacent to the upper side 113 and spaced from the lower side 118. The machine body 96 includes a bottom end face 115A located between the upper side 113 and the lower side 118. The supporting portion 115 includes a groove 117 extending from the upper side 113 to the bottom end face 115A. An installation portion 131 is disposed on the second side 111 for installation of the fan 135, the control module 134, etc. Furthermore, the machine body 96 includes an air output hole % A extending from a wall of the first side 98 to the installation portion 131. The air output hole 96A intercommunicates with an air outlet 139 of the fan 135 and extends in a direction intersecting with an extending direction of the opening 179.

An end cover 175 is mounted to the bottom end face 115A of the machine body 96. The end cover 175 includes an opening 179 aligned with the groove 117. A supporting cover 211 is disposed on the end cover 175 and located in the groove 117. The supporting cover 211 includes a passage 213 aligned with the opening 179 of the end cover 175. An electric pole module 197 is disposed between the supporting cover 211 and the end cover 175. The electric pole module 197 includes two electrically conductive members 199 whose distal ends extend through the supporting cover 211 to the outside.

In use, the cap 22A of the atomization bottle 20 is opened to reveal the opening section 28. Then, the atomization bottle 20 is turned upside down and is placed into the groove 117 with the bottleneck 24 facing the supporting cover 211. The supporting cover 211 is received in the opening section 28 of the bottle 22, and the two electrically conductive members 199 are in electrical connection with the two electrically conductive portions 74. Furthermore, the atomization vibration film 64 is aligned with the passage 213 and the opening 179. Thus, the control module 134 can drive the atomization bottle cork 21 to operate for generating a mist and can drive the fan 135 to rotate for generating air current for blowing the mist away from the atomization device 10.

In each embodiment, the overall manufacturing cost of the atomization bottle cork 21 without the power supply 133 and the control module 134 is cheap (the cost of the atomization vibration film 64 is about US$0.1), which is advantageous to the disposal design of the atomization bottle 20.

Conventionally, the whole atomization device 10 must be replaced or repaired when filth accumulates on the surface of the atomization vibration film 64. The disposable design of the atomization bottle 20 (with an atomization vibration film 64) in each embodiment solves this problem at a small cost. Furthermore, the manufacturers can be continually benefited such as by selling atomization bottles 20 containing various liquids having different flavors, different effects or different functions.

In each embodiment, the outer surface 34 of the main cork body 32 is spaced from the distal end of the bottleneck 24, such that a consumer is difficult to detach the atomization bottle cork 21 by himself or herself, avoiding the consumer from adding improper ingredients into the liquid, thereby avoiding malfunction of or affection on the surface of the atomization vibration film 64.

In each embodiment, the cork 22A seals the opening section 28, such that leakage of the liquid in the chamber 26 is prevented before using the atomization bottle 20 while preventing ambient impurities or dust from contacting with the atomization bottle cork 21.

Due to disposition of the auxiliary cork body 43, the possibility of leakage of the liquid from the passage 41 before use is reduced.

Due to disposition of the passage 41, the pressure in the chamber 26 and the pressure at the outside of the chamber 26 can be balanced during use of the atomization bottle 20. The problem of reduction in the amount of liquid causing reduction in the pressure in the chamber 26 and subsequent adverse influence on the capillary action of the delivery member 86 can be avoided.

Due to disposition of electrical connection between the two electrically conductive members 199 of the atomization machine 95 and the two electrically conductive portions 74 of the atomization bottle cork 21 and due to the operation controlled by the atomizer 62, the atomization bottle 20 can be installed easily.

In the first embodiment, the first and second magnetic elements 119A and 191A are adjacent to and attract each other when the end cover 175 is in the operating position, such that the end cover 175 can be reliably retained in the operating position, further assuring electrical connection between the two electrically conductive members 199 and the two electrically conductive portions 74.

In the second embodiment in which the atomization bottle 20 is upside-down in use, the atomization bottle 20 does not have to include the supporting tube 76 and the delivery member 86, further reducing the manufacturing costs.

In the atomization machine 95 of the second embodiment, the end cover 175 is not pivotable to simplify the structure of the atomization machine 95, effectively reducing the manufacturing costs.

Now that the basic teachings of the present invention have been explained, many extensions and variations will be obvious to one having ordinary skill in the art. For example, the two electrically conductive portions 74 of the electrically conductive module 66 may be arranged in a manner different from the concentric arrangement shown in the drawings. As an example, the electrically conductive module 66 may be comprised of two arcuate cooper plates which are concentric and independent from each other (not connected). These simple modifications are still within the scope of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. An atomization bottle comprising:

a bottle including a bottleneck, wherein the bottle is configured to receive a liquid to be atomized; and an atomization bottle cork sealingly coupled with the bottleneck of the bottle, wherein the atomization bottle cork includes an atomizer free of power and a power module, wherein the atomization bottle cork further includes an electrically conductive module in electrical connection with the atomizer, wherein the electrically conductive module includes two electrically conductive portions configured to be in electrical connection with an atomization machine, wherein the atomization bottle cork is configured to prevent passage of the liquid but allow atomized tiny water molecules to pass through the atomizer and to be sprayed to an outside of the bottle, wherein the atomization bottle cork further includes:

a main cork body, wherein the bottle includes a chamber receiving the liquid, wherein the main cork body includes an outer surface and an inner surface, wherein the main cork body further includes a recessed portion extending from the outer surface and a main cork body through-hole intercommunicating with the recessed portion and the chamber, wherein the main cork body further includes a passage extending from the outer surface to the inner surface and a coupling portion extending from the inner surface, wherein the coupling portion intercommunicates with the passage and is located on an inner side of the bottle, wherein the passage intercommunicates with the chamber, and wherein the atomizer is received in the recessed portion and seals the main cork body through-hole;

an auxiliary cork body detachably and sealingly coupled with the passage, wherein the auxiliary cork body includes a stem on an outer side of the outer surface; and a one-way valve coupled with the coupling portion, wherein when the auxiliary cork body is coupled with the main cork body, no fluid is permitted to flow between the passage and the chamber of the bottle, wherein when the auxiliary cork body is detached from the main cork body, air outside of the bottle is permitted to flow into the chamber of the bottle, and the liquid in the chamber is prevented from flowing through the passage.

2. The atomization bottle as claimed in claim 1, wherein the atomization bottle cork further includes:

a cap sealingly and detachably coupled with the bottleneck, wherein when the cap is not detached, the atomization bottle cork is sealed, and electrical connection with the two electrically conductive portions is prevented, wherein when the cap is detached, the atomization bottle cork is exposed to permit electrical connection with the two electrically conductive portions; and a main cork body, wherein the bottle further includes a chamber receiving the liquid, wherein the chamber includes an opening section located in the bottleneck and intercommunicating with the outside of the bottle, wherein the main cork body includes an outer periphery sealingly coupled with the opening section and an outer surface facing the outside of the bottle, wherein the main cork body further includes a recessed portion extending from the outer surface and a main cork body through-hole intercommunicating with the recessed portion and the opening section, wherein the atomizer is received in the recessed portion and seals the main cork body through-hole, wherein the outer surface of the main cork body is spaced from a distal end of the bottleneck in an axial direction of the opening section and is received in the opening section.

3. The atomization bottle as claimed in claim 2, wherein the electrically conductive module is received in the recessed portion, wherein the atomizer is located between the electrically conductive module and the main cork body through-hole, wherein the electrically conductive module includes a module through-hole aligned with the main cork body through-hole, wherein the atomizer includes an atomization vibration film aligned with the module through-hole and the main cork body through-hole.

4. The atomization bottle as claimed in claim 3, wherein the electrically conductive module further includes a first side and a second side spaced from the first side, wherein the second side faces the atomizer, wherein the module through-hole extends from the first side through the second side, wherein two electrically conductive portions are formed on the first side, wherein the electrically conductive module further includes two contacts extending from the two electrically conductive portions to the second side, and wherein the atomizer is in electrical connection with the two contacts.

5. The atomization bottle as claimed in claim 2, wherein the atomization bottle cork further includes:

a supporting tube including an engaging end and a closed end, wherein the supporting tube further includes a receiving chamber extending from the engaging end towards but spaced from the closed end, wherein the main cork body further includes an inner face spaced from the outer surface in an axial direction of the main cork body through-hole, wherein the main cork body further includes a coupling skirt extending from the inner surface and defining a hole intercommunicating with the main cork body through-hole, wherein the engaging end of the supporting tube is coupled with the coupling skirt of the main cork body, wherein the closed end of the supporting tube extends into the chamber of the bottle, and wherein the liquid enters the receiving chamber; and a delivery member received in the receiving chamber of the supporting tube, wherein the delivery member includes an outer end abutting the atomizer, and wherein the delivery member is configured to deliver the liquid to the atomizer.

6. The atomization bottle as claimed in claim 5, further comprising a supporting spring, wherein the delivery member includes an inner end spaced from the outer end, wherein the supporting spring is disposed between the closed end of the supporting tube and the inner end of the delivery member and is configured to support the outer end of the delivery member to abut against the atomizer, and wherein the delivery member delivers the liquid in the chamber towards atomizer under capillary action.

7. The atomization bottle as claimed in claim 2, wherein the atomization bottle cork further includes a sealing gasket received in the recessed portion, wherein the sealing gasket includes first and second surfaces spaced from each other in the axial direction of the main cork body through-hole, wherein the sealing gasket further includes a gasket through-hole extending from the first surface through the second surface, wherein the gasket through-hole has an inner periphery, wherein the sealing gasket further includes an engaging groove extending radially from the inner periphery and located between the first surface and the second surface, wherein an outer periphery of the atomizer is coupled with the insertion groove, wherein the atomizer includes an atomization vibration film located in the gasket through-hole, wherein the electrically conductive module abuts against the first surface of the sealing gasket, wherein the recessed portion of the main cork body further includes a first annular face contiguous to the main cork body through-hole, wherein the second surface of the sealing gasket sealingly abuts against the first annular surface, and wherein the atomization vibration film is operable to atomize the liquid in the bottle.

8. An atomization device comprising:

a machine body including a groove and an installation portion spaced from the groove, wherein the installation portion receives a control module and a power supply module in electrical connection with the control module;

an end cover coupled with the machine body and including an opening;

an electric pole module in electrical connection with the control module and including two electrically conductive members, wherein the electric pole module is mounted to the end cover and is misaligned from the opening;

a disposable atomization bottle including:

a bottle configured to receive a liquid to be atomized, wherein the bottle is detachably coupled with the groove;

an atomization bottle cork sealingly coupled with the bottle, wherein the atomization bottle cork includes an atomizer free of power and the power module, wherein the atomization bottle cork further includes an electrically conductive module in electrical connection with the atomizer, wherein the electrically conductive module includes two electrically conductive portions, wherein the atomization bottle cork is configured to prevent passage of the liquid but allow atomized tiny water molecules to pass through the atomizer and to be sprayed to an outside of the bottle, wherein when the bottle is coupled with the groove and the two electrically conductive members are in electrical connection with the two electrically conductive portions, the opening of the end cover is aligned with the atomizer, the atomizer is operable under activation by the control module and sprays atomized liquid outwards via the opening of the end cover, and wherein when the bottle is not coupled with the groove, the two electrically conductive members are not in electrical connection with the two electrically conductive portions, the atomizer is not operable, and the opening of the end cover is not aligned with the atomizer.

9. The atomization device as claimed in claim 8, wherein the machine body includes an upper side and two pin coupling portions on the upper side, wherein the end cover is pivotably connected to the two pin coupling portions and is pivotable between an open position and an operating position, wherein when the bottle is coupled with the groove and the end cover is in the operating position, the two electrically conductive members are in electrical connection with the two electrically conductive portions, and the bottle is prevented from disengaging from the groove, and the opening of the end cover is aligned with the atomizer.

10. The atomization device as claimed in claim 9, further comprising:

a fan mounted to the installation portion, wherein the end cover further includes an air feeding hole spaced from the opening of the end cover, wherein the air feeding hole extends in a direction intersecting with an extending direction of the opening of the end cover, wherein the fan further includes an air outlet, wherein the fan is configured to output air current via the air feeding hole;

a guiding hood including a coupling end coupled with the air outlet of the fan and a tail end extending through the opening of the machine body, wherein the machine body further includes an upper side and an opening on the upper side, wherein the end cover is pivotable relative to the machine body between an open position and an operating position, wherein when the end cover is in the open position, the tail end of the guiding hood is spaced from the air feeding hole, and wherein when the end cover is in the operating position, the tail end of the guiding hood is contiguous to the air feeding hole, and the two electrically conductive members are in electrical connection with the two electrically conductive portions of the electrically conductive module; and a supporting cover mounted to the end cover and including a passage aligned with the opening of the end cover, wherein the electric pole module is located between the end cover and the supporting cover, wherein a distal end of each of the two electrically conductive members extends beyond the supporting cover, wherein the bottle includes a bottleneck and a chamber receiving the liquid, wherein the chamber includes an opening section located in the bottleneck and intercommunicating with an outside of the bottle, wherein when the end cover is in the operating position, the supporting cover and the electric pole module are on an inner side of the opening section.

11. The atomization device as claimed in claim 10, wherein the groove is open, wherein the machine body further includes a lower side spaced from the upper side, wherein the machine body further includes a supporting portion formed on the lower side and contiguous to the groove, wherein the bottle includes a bottom, wherein when the bottle is coupled with the groove, the bottom of the bottle abuts against the supporting portion, wherein when the end cover is in the operating position, the supporting portion cooperates with the supporting cover to prevent the bottle from disengaging from the groove.

12. The atomization device as claimed in claim 8, wherein the machine body further includes a first side and a second side, wherein the machine body further includes upper and lower sides extending between the first and second sides and spaced from each other, wherein the installation portion is formed on the second side, wherein the machine body further includes a supporting portion protruding from the first side, wherein the supporting portion includes a bottom end face located between the upper side and the lower side, wherein the groove extends from the upper side to the bottom end face, and wherein when the atomization bottle is coupled with the groove, the atomization bottle cork faces the bottom side.

13. The atomization device as claimed in claim 12, further comprising:

a fan mounted to the installation portion, wherein the machine body further includes an air output hole on the first side, wherein the air output hole extends in a direction intersecting with an extending direction of the opening of the end cover, wherein the fan further includes an air outlet intercommunicating with the air output hole; and a supporting cover mounted to the end cover and including a passage aligned with the opening of the end cover, wherein the end cover is mounted to the bottom end face of the supporting portion, wherein the supporting cover includes an opening intercommunicating with the groove, wherein the electric pole module is located between the end cover and the supporting cover, wherein a distal end of each of the two electrically conductive members extends beyond the supporting cover, wherein the bottle includes a bottleneck and a chamber receiving the liquid, wherein the chamber includes an opening section located in the bottleneck and intercommunicating with an outside of the bottle, wherein when the bottle is coupled with the groove, the supporting cover is located in the opening section.

14. The atomization device as claimed in claim 8, further comprising:

a main cork body, wherein the bottle includes a chamber receiving the liquid and a bottleneck, wherein the chamber includes an opening section located in the bottleneck and intercommunicating with an outside of the bottle, wherein the main cork body includes an outer periphery sealingly coupled with the opening section and an outer surface extending towards the outside of the bottle, wherein the main cork body further includes a recessed portion extending from the outer surface and a main cork body through-hole intercommunicating with the recessed portion and the chamber, wherein the atomizer is received in the recessed portion and seals the main cork body through-hole; and a cap sealingly and detachably coupled with the bottleneck, wherein when the cap is not detached, the atomization bottle cork is sealed, and electrical connection with the two electrically conductive portions is prevented, and wherein when the cap is detached, the atomization bottle cork is exposed to permit electrical connection with the two electrically conductive portions.

15. The atomization device as claimed in claim 14, wherein the electrically conductive module is received in the recessed portion, wherein the atomizer is located between the electrically conductive module and the main cork body through-hole, wherein the electrically conductive module includes a module through-hole aligned with the main cork body through-hole, wherein the electrically conductive module further includes a first side and a second side spaced from the first side, wherein the second side faces the atomizer, wherein the module through-hole extends from the first side through the second side, wherein two electrically conductive portions are formed on the first side, wherein the electrically conductive module further includes two contacts extending from the two electrically conductive portions to the second side, wherein the atomizer includes an atomization vibration film aligned with the module through-hole and the main cork body through-hole, and wherein the atomizer is in electrical connection with the two contacts.

16. The atomization device as claimed in claim 14, wherein the atomization bottle cork further includes:

a supporting tube including an engaging end and a closed end, wherein the supporting tube further includes a receiving chamber extending from the engaging end towards but spaced from the closed end, wherein the main cork body further includes an inner face spaced from the outer surface in an axial direction of the main cork body through-hole, wherein the main cork body further includes a coupling skirt extending from the inner surface and defining a hole intercommunicating with the main cork body through-hole, wherein the engaging end of the supporting tube is coupled with the coupling skirt of the main cork body, wherein the closed end of the supporting tube extends into the chamber of the bottle, and wherein the liquid enters the receiving chamber;

a delivery member received in the receiving chamber of the supporting tube, wherein the delivery member includes an outer end abutting against the atomizer, wherein the delivery member further includes an inner end spaced from the outer end, and wherein the delivery member is configured to deliver the liquid to the atomizer; and a supporting spring, wherein the supporting spring is disposed between the closed end of the supporting tube and the inner end of the delivery member and is configured to support the outer end of the delivery member to abut against the atomizer, and wherein the delivery member delivers the liquid in the chamber towards atomizer under capillary action.

17. The atomization device as claimed in claim 14, wherein the atomization bottle cork further includes a sealing gasket received in the recessed portion, wherein the sealing gasket includes first and second surfaces spaced from each other in the axial direction of the main cork body through-hole, wherein the sealing gasket further includes a gasket through-hole extending from the first surface through the second surface, wherein the gasket through-hole has an inner periphery, wherein the sealing gasket further includes an engaging groove extending radially from the inner periphery and located between the first surface and the second surface, wherein an outer periphery of the atomizer is coupled with the insertion groove, wherein the atomizer includes an atomization vibration film received in the gasket through-hole, wherein the electrically conductive module abuts against the first surface of the sealing gasket, wherein the recessed portion of the main cork body further includes a first annular face contiguous to the main cork body through-hole, wherein the second surface of the sealing gasket sealingly abuts against the first annular surface, and wherein the atomization vibration film is operable to atomize the liquid in the bottle.

18. The atomization device as claimed in claim 8, wherein the atomization bottle cork further includes:

a main cork body, wherein the bottle includes a chamber receiving the liquid, wherein the main cork body includes an outer surface and an inner surface, wherein the main cork body further includes a recessed portion extending from the outer surface and a main cork body through-hole intercommunicating with the recessed portion and the chamber, wherein the main cork body further includes a passage extending from the outer surface to the inner surface and a coupling portion extending from the inner surface, wherein the coupling portion intercommunicates with the passage and is located on an inner side of the bottle, wherein the passage intercommunicates with the chamber, and wherein the atomizer is received in the recessed portion and seals the main cork body through-hole;

an auxiliary cork body detachably and sealingly coupled with the passage, wherein the auxiliary cork body includes a stem on an outer side of the outer surface; and a one-way valve coupled with the coupling portion, wherein when the auxiliary cork body is coupled with the main cork body, no fluid is permitted to flow between the passage and the chamber of the bottle, wherein when the auxiliary cork body is detached from the main cork body, air outside of the bottle is permitted to flow into the chamber of the bottle, and the liquid in the chamber is prevented from flowing through the passage.

19. The atomization device as claimed in claim 8, wherein the machine body further includes a stop wall on an outer side of the groove and a first magnetic member in the stop wall, wherein the end cover includes a wall extension corresponding to the stop wall and a second magnetic member disposed in the wall extension, wherein the end cover is pivotable between an open position and an operating position, wherein when the bottle is coupled with the groove and the end cover is in the open position, the first and second magnetic members are away from each other, and the bottle is disengageable from the groove, and wherein when the bottle is coupled with the groove and the end cover is in the operating position, the two electrically conductive members are in electrical connection with the two electrically conductive portions, and the first and second magnetic members attract each other, reliably retaining the end cover in the operating position.

* * * * *